United States Patent

Schutte et al.

[11] Patent Number: 5,958,588
[45] Date of Patent: Sep. 28, 1999

[54] PROCESS FOR PREPARING ALKALI METAL CYANIDE AND ALKALINE EARTH METAL CYANIDE GRANULES AND THE HIGH PURITY ALKALI METAL CYANIDE GRANULES OBTAINABLE THEREBY

[75] Inventors: Rudiger Schutte, Frankfurt; Hans Christian Alt, Gelnhausen; Catrin Becker-Balfanz, Frankfurt; Manfred Sauer, Rodenbach; Lukas Von Hippel, Alzenau; Oliver Feuer, Nidderau; Jurgen Lorosch, Wachtersbach, all of Germany

[73] Assignee: Degussa-Huls AG, Hanau, Germany

[21] Appl. No.: 09/018,894

[22] Filed: Feb. 5, 1998

[30] Foreign Application Priority Data

Feb. 15, 1997 [DE] Germany ............................ 197 04 180

[51] Int. Cl.$^6$ .................................. B32B 5/16; C01C 3/08
[52] U.S. Cl. ......................... 428/402; 423/371; 423/379
[58] Field of Search ..................... 423/379, 371; 428/402

[56] References Cited

U.S. PATENT DOCUMENTS

| 5,383,940 | 1/1995 | Bober . |
| 5,674,617 | 10/1997 | Riemenschneider . |

FOREIGN PATENT DOCUMENTS

| 0 600 211 | 6/1994 | European Pat. Off. . |
| 0 600 282 | 6/1994 | European Pat. Off. . |
| 38 32 883 | 3/1990 | Germany . |
| 3832883 | 3/1990 | Germany ................................ 423/379 |
| 42 40 318 | 6/1994 | Germany . |
| 42 40 576 | 6/1994 | Germany . |

OTHER PUBLICATIONS

Uhlemann, Kontinuierliche Wirbelschicht–Spruhgranulation, Chem.–Ing.–Tech. 62 (1990) No. 10, pp. 822–834.
Trojosky, Rauchgasreinigung durch Absorptions–trocknung in der Wirbelschieht, Chem. Ing. Technik 9:95, p. 174.
Ullmann's Encyclopedia of Industrial Chemistry, 5th Ed. (1987) vol. A8, pp. 161–163.
Ozaki et al., "High–Purity Alkali Metal Cyanide", Chemical Abstracts, vol. 88, No. 10, (Mar. 6, 1978), XP–002064496.

Primary Examiner—Wayne Langel
Attorney, Agent, or Firm—Pillsbury Madison & Sutro LLP

[57] ABSTRACT

A process for the direct preparation of alkali metal cyanide and alkaline earth metal cyanide granules from an HCN-containing gas and an aqueous solution or suspension of an alkali metal or alkaline earth metal hydroxide. The reaction is performed in a reactor for fluidized bed spray granulation, wherein a solution or suspension of the hydroxide is sprayed onto seed granules of the cyanide being prepared and at the same time a hydrogen cyanide-containing gas is supplied to the reactor and water is evaporated by means of a fluidizing gas. The preferred fluidizing gas is steam. The reaction gases from a BMA or Andrussow process may be quenched with water and the gas mixture used as fluidizing gas. By using a $CO_2$-free HCN-containing gas, alkali metal cyanide granules with advantageous properties, including a combined concentration of alkali metal carbonate and alkali metal formate of less then 0.4 wt. %, are obtainable.

18 Claims, 3 Drawing Sheets

PROCESS FOR PREPARING ALKALI METAL CYANIDE AND ALKALINE EARTH METAL CYANIDE GRANULES AND THE HIGH PURITY ALKALI METAL CYANIDE GRANULES OBTAINABLE THEREBY

FIELD OF THE INVENTION

The invention relates to a process for preparing alkali metal cyanide and alkaline earth metal cyanide granules, in particular granules comprising substantially sodium cyanide, potassium cyanide and calcium cyanide. The process is based on the reaction of hydrogen cyanide with an alkali metal hydroxide or a alkaline earth metal hydroxide in a fluidized bed and is called reactive fluidized bed granulation (RFBG). The invention also relates to the spherical NaCN and KCN granules, which are characterized by high purity, obtainable by the process.

BACKGROUND OF THE INVENTION

Sodium and potassium cyanide are used widely for preparing electrolytic baths and case hardening salt baths and for the synthesis of organic compounds; sodium cyanide and calcium cyanide are used in large amounts for recovering gold by the cyanide leaching of ores. When used for electrolytic baths, the alkali metal cyanides must also have very high purity. Whereas a small concentration of alkali metal hydroxide in alkali metal cyanide acts as a stabilizer, the concentration of alkali metal carbonate and alkali metal formate must be as low as possible. From a safety point of view, cyanides generally have to be available in a dust-free granular form.

It is known that alkali metal cyanides can be prepared by neutralizing hydrogen cyanide (HCN) and alkali metal hydroxide in aqueous solutions followed by crystallization, solid/liquid separation and subsequent mechanical shaping. These types of processes are very costly and the products tend to form dust and are therefore difficult to handle. A particular disadvantage is that some of the mother liquor has to be removed from the process in order to counteract enrichment of by-products and to obtain pure products. Between 10 and 30% of alkali metal cyanide is generally eliminated with the mother liquor.

The industrial process used hitherto for shaping alkali metal cyanides, which is very costly, can be substantially improved by so-called fluidized bed spray granulation, as described in EP-A 0 600 282. In the process mentioned, an alkali metal cyanide solution is sprayed onto a fluidized bed comprising seed granules of alkali metal cyanides and the water introduced is evaporated by means of a stream of drying gas flowing through the fluidized bed. Granules comprising substantially spherical particles which have very low abrasion and a low caking index are obtained. Since an aqueous alkali metal cyanide solution is required in order to perform the process in EP-A 0 600 282 and this is obtained in a known manner by neutralizing HCN with alkali metal hydroxide in aqueous solution, this solution also contains known by-products, including in particular the corresponding carbonate and formate. As a result of using an alkali metal cyanide solution which contains the by-products, the alkali metal cyanide granules prepared therefrom cannot be any purer than the solution itself. Additional alkali metal carbonate is formed due to reaction of the carbon dioxide contained in the fluidizing/drying air with excess alkali metal hydroxide contained in the alkali metal cyanide solution, so that the alkali metal carbonate concentration in the alkali metal cyanide granules is generally greater than that of alkali metal cyanides produced by a crystallization process with subsequent shaping.

A quite different process for preparing solid particulate alkali metal cyanides is known from DE-A 38 32 883. In this process a hydrogen cyanide-containing gas is reacted continuously with finely distributed droplets of an aqueous alkali metal hydroxide solution, while water which is introduced and produced is simultaneously evaporated. Deposited solid particles, after separation, are taken to a shaping and/or post-drying process. This process thus constitutes a spray drying process which is combined with a gas/liquid reaction, here a neutralization reaction. Using this process, therefore, products with a high concentration of alkali metal cyanide are only produced if HCN is used in a large excess and the alkali metal hydroxide has a low concentration. The combination of spray drying and neutralization has the disadvantage that the fine drops start to dry from the outside, which is where the alkali metal cyanide has formed. Diffusion of the HCN gas into the inner core of the droplets, where liquid alkali metal hydroxide solution is still present, becomes difficult as the layer of solid in the outer region becomes thicker. In order to produce a high rate of conversion, therefore, the driving force for diffusion must be high and this is favored by a high excess of HCN and/or a reduction in the drying time. However this reduces the space-time yield for the process. A further disadvantage of this process is that the product is obtained as a fine powder and has to be shaped in additional process steps to provide granules which are safe to handle.

DE-A 38 32 883 mentioned above also discloses that virtually no reaction takes place between solid, finely distributed alkali metal hydroxide and gaseous hydrogen cyanide at the temperatures which are suitable for the process. The reaction requires the presence of water and dissolved alkali metal hydroxide. Taking into account this disclosure, this process cannot be used to prepare alkaline earth metal cyanides, in particular calcium cyanide, by using an aqueous suspension of an alkaline earth metal hydroxide.

Trojosky et. al. in Chem. Ing. Technik September 1995, page 184, describe a process for half-dry flue gas desulphurization by using an absorption drying process in a fluidized bed. In this process, an aqueous calcium hydroxide suspension is applied to the surface of a fluidized bed in a fluidized bed unit using two-fluid nozzles. Although a satisfactory degree of desulphurization of the flue gas is produced by adding the absorption agent in an amount greater than that required stoichiometrically, the proportion of gypsum in the extracted granular end product is too low, since it also contains a considerable amount of calcium oxide or calcium hydroxide in addition to gypsum. Due to the incomplete reaction and thus unsatisfactory purity of the granular material obtained, it is not obvious that the process described in this document can be used for preparing alkali metal cyanides and alkaline earth metal cyanides, in particular alkali metal cyanides of high purity.

SUMMARY OF THE INVENTION

The object of the invention is to provide an improved process for preparing alkali metal cyanide and alkaline earth metal cyanide granules which makes the separate preparation of an aqueous solution of an alkali metal cyanide or alkaline earth metal cyanide superfluous and also avoids the disadvantages of the previously known process based on a combination of spray drying and neutralization. A further object of the invention is to provide a process for preparing sodium cyanide and potassium cyanide granules which are characterized by both exceptionally good granular properties and high purity. Finally the process according to the invention is intended to enable the use of hydrogen cyanide-containing gases from different origins and thus with different gas compositions.

A process for preparing alkali metal cyanide or alkaline earth metal cyanide granules was found that includes reacting hydrogen cyanide with an alkali metal hydroxide or alkaline earth metal hydroxide, wherein the alkali metal hydroxide in the form of an aqueous solution and the alkaline earth metal hydroxide in the form of an aqueous suspension are sprayed into a reactor and there reacted with gaseous hydrogen cyanide, and evaporation of the water introduced to and formed in the reactor, which is characterized in that the reaction is performed in a reactor for fluidized bed spray granulation with a fluidized bed temperature in the range 100 to 250° C., the solution or suspension mentioned is sprayed onto a fluidized bed substantially consisting of seed granules of the alkali metal or alkaline earth metal cyanide being prepared, a hydrogen cyanide-containing gas in an amount of at least one mole of HCN per metal equivalent is introduced to the reactor at the same time and the water is evaporated by means of a fluidizing gas, whose inlet temperature is between 110° and 500° C., flowing through the fluidized bed.

Although cyanide granules of any alkali metal or alkaline earth metal can be prepared by the process according to the invention, the process is particularly suitable-for preparing sodium cyanide (NaCN), potassium cyanide (KCN) and calcium cyanide ($Ca(CN)_2$) granules. The process is especially suitable for preparing NaCN and KCN granules, in particular those with high purity.

In the process according to the invention the following process takes place on the individual particles in the fluidized bed; the HCN gas introduced into the reactor diffuses into the alkali metal hydroxide solution or alkaline earth metal hydroxide suspension with which the seed granules are wetted and there reacts to form the corresponding cyanide in dissolved form. This solution dries out on the particle surfaces from the inside outward, associated with growth of the seed granules. This process differs from the known building-up granulation process in which solutions or suspensions containing the granule-producing substance are used, in that a neutralization reaction takes place only on the particle surfaces and this produces the material required for particle growth. Using this mode of operation the drying procedure no longer hinders diffusion of the HCN gas so that highly concentrated liquors and HCN can be used in approximately stoichiometric ratio. The water formed during the reaction and the water introduced with the solution or suspension is evaporated by using the heat of reaction supplied by the neutralization reaction and the heat energy of the hot fluidizing gas. The process according to the invention is therefore a reactive fluidized bed granulation (RFBG) process.

The process according to the invention may be performed batchwise or continuously in any form of reactor which is suitable for fluidized bed spray granulation. The principles of fluidized bed spray granulation, different types of reactors which can be used for this process and variants of the process are known to a person skilled in the art (for example reference is made to H. Uhlemann in Chem. Ing. Tech. 62 (1990) No. 10, pp 822–834). For example, the reactor may be designed as a circular container provided with a gas feed base (fluidized bed base) or as a flow channel. One or more spray nozzles are located in the reactor, wherein the nozzle opening is expediently located within the fluidized bed. The orientation of the nozzle may enable spraying from the bottom upwards and/or from the top downwards or substantially parallel to the gas feed base. Reactors suitable for continuous operation generally also have a device for continuous or periodic discharge of granules, wherein this device is expediently designed so that it enables classification of the granules while they are being discharged.

To perform the process, a hydrogen cyanide-containing gas is supplied to the reactor. This gas may be introduced into the reactor mixed with the fluidizing gas stream. Alternatively, or in addition to the previously-mentioned type of introduction, the hydrogen cyanide-containing gas may also be introduced into the reactor above the gas feed base, in particular by means of a nozzle located within the fluidized bed. If the hydrogen cyanide-containing gas is added to the fluidizing gas stream, this may take place directly below the gas feed base or at a previous stage, for example before heating the fluidizing gas.

Introduction of the alkali metal hydroxide solution or alkaline earth metal hydroxide suspension into the reactor takes place by means of conventional spray devices, for example using single-fluid pressurized nozzles or using multi-component nozzles. When using two-fluid nozzles, one fluid may be the alkali metal hydroxide solution or alkaline earth metal hydroxide suspension and the second fluid may be a conventional propellant, for example $N_2$, or a hydrogen cyanide-containing gas. The alkali metal hydroxide solution being sprayed may contain any concentration of alkali metal hydroxide. The concentration of alkali metal hydroxide in the solution is generally in the range between 10 and 70 wt. %, preferably between 20 and 50 wt. % and in particular between 30 and 50 wt. %. To prepare alkaline earth metal cyanides, an alkaline earth metal hydroxide suspension with a concentration of less than 50 wt. %, in particular 5 to 30 wt. %, is expediently used.

The hydrogen cyanide-containing gas to be used in the process according to the invention may be pure hydrogen cyanide or a hydrogen cyanide-containing gas, for example a gas such as is obtained as a reaction gas in conventional processes for preparing HCN or a gas which is produced within the context of other processes, in particular as a by-product in the Sohio process for preparing acrylonitrile. Conventional processes for preparing hydrogen cyanide are the Andrussow process, the BMA process and the Shawinigan process (see Ullmann's Encyclopedia of Industrial Chemistry, 5th edition (1987) Vol. A8, 161–163). The reaction gas (crude gas) formed in the Andrussow process, the ammoxidation of methane, has the following typical composition (in wt. %): $N_2$ 53.7%, $H_2O$ 31.4%, HCN 8.4%, $CO_2$ 3.6%, $H_2$ 1.1%, $NH_3$ 1.0%, CO 0.7% and $CH_4$ 0.1%. The crude gas from the BMA process, in contrast, contains HCN (about 23 vol. %) and $H_2$ (about 72 vol. %) as major constituents; in addition the BMA crude gas also contains residues of unreacted ammonia and methane and some nitrogen. The crude gas in the Shawinigan process also contains HCN (about 25 vol. %) and $H_2$ (about 72 vol. %) as major components.

In the process according to the invention, HCN is used in stoichiometric or greater than stoichiometric amounts, with reference to the alkali metal hydroxide or alkaline earth metal hydroxide. The ratio of moles of HCN to equivalents of metal hydroxide is generally in the range 1 to 5. To prepare NaCN and KCN granules, a molar ratio of HCN to alkali metal hydroxide of 1 to 5, preferably 1 to 1.5 and in particular 1 to 1.1 is used.

The fluidized bed temperature is generally in the range from about 100° to 250° C. In principle, the process may also be performed at a temperature above 250° C., but the cyanide content then decreases steadily. In principle, the fluidized bed temperature may also be below 100° C., for example 90° to 95°C., when operated under reduced pressure. The fluidized bed temperature is preferably between 105° and 180° C. The fluidized bed temperature is in particular between 105° and 150° C.

The fluidizing gas which, as described above, may already contain the HCN-containing gas, expediently has an inlet temperature between 110° and 500° C., preferably between 120° and 400° C.

Suitable fluidizing gases for the process according to the invention are inert gases such as nitrogen, in particular however superheated steam. Air cannot be used as a fluidizing gas because the HCN/air mixture likely to be used in an industrial unit would lie within the explosive region. (In the previously mentioned process according to DE-A 38 32 883, nitrogen was used to make the system inert for this reason.) In the particularly preferred embodiment according to the invention, using dry steam, there is no polymerization of unreacted hydrocyanic acid when the discharge temperature is above 100° C. in the dry steam region, so that a plant layout with a circulating gas supply is possible. When using this type of embodiment, the gas stream emerging from the fluidized bed is split into two sub-streams. The first sub-stream (circulating gas stream) is recycled as the fluidizing gas, after being reheated. The second sub-stream (excess gas) is removed from the circuit. The steam in the circulating gas is provided by the water of reaction and by evaporating the solution in the process. The use of a circulating gas reduces the cost of vent gas treatment considerably because the excess steam can be completely condensed and only the volatile gas constituents have to be taken to further treatment. Further embodiments of the process according to the invention are explained using FIGS. 1 to 3.

DETAILED DESCRIPTION OF THE PREFERRED EMBODIMENTS

Figure 1:
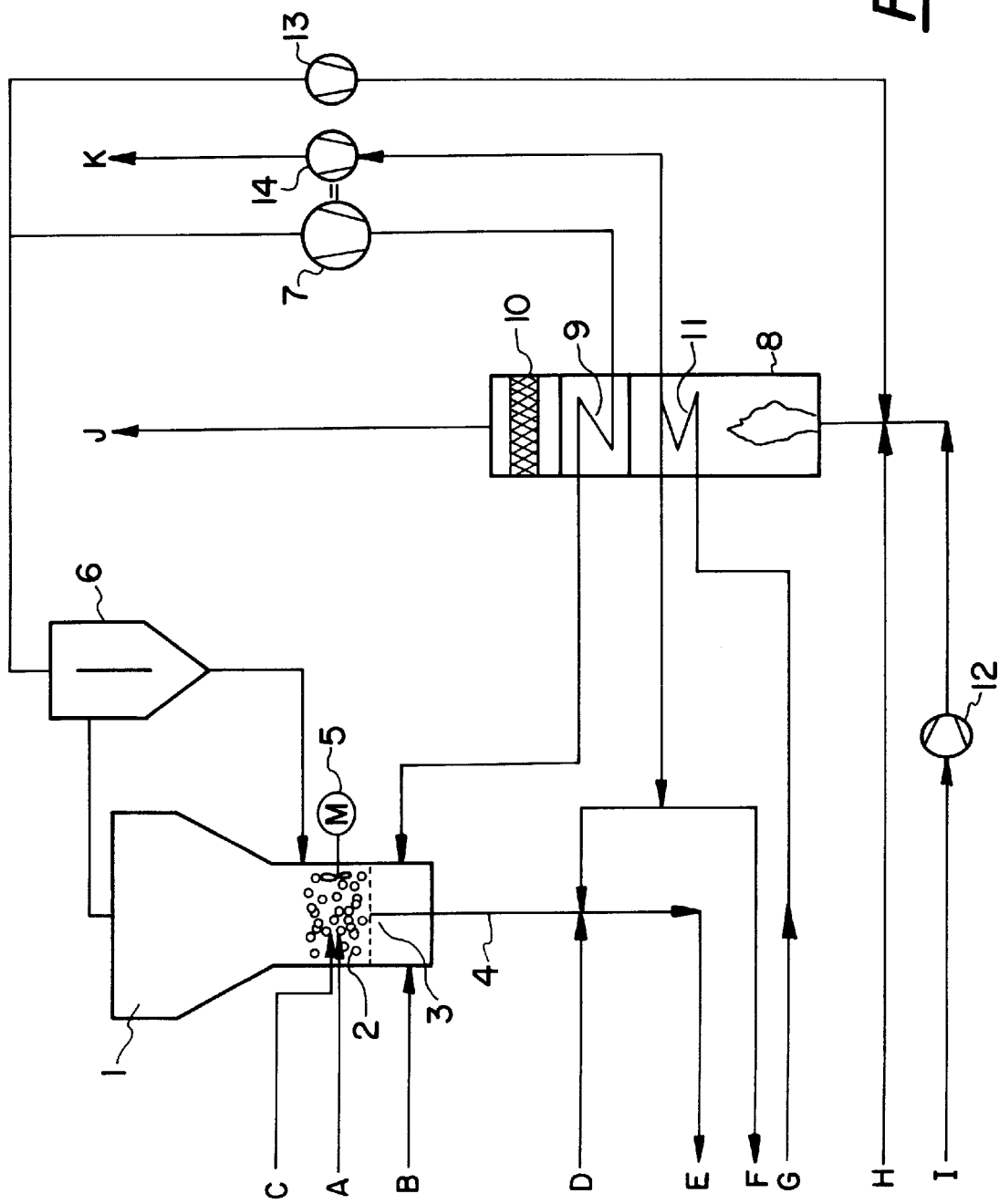
FIG. 1 shows a process scheme for preparing alkali metal cyanide granules using a BMA reaction gas by reactive fluidized bed granulation (RFBG) according to the invention, with a circulating gas supply and combustion of the excess gas.
Figure 2:
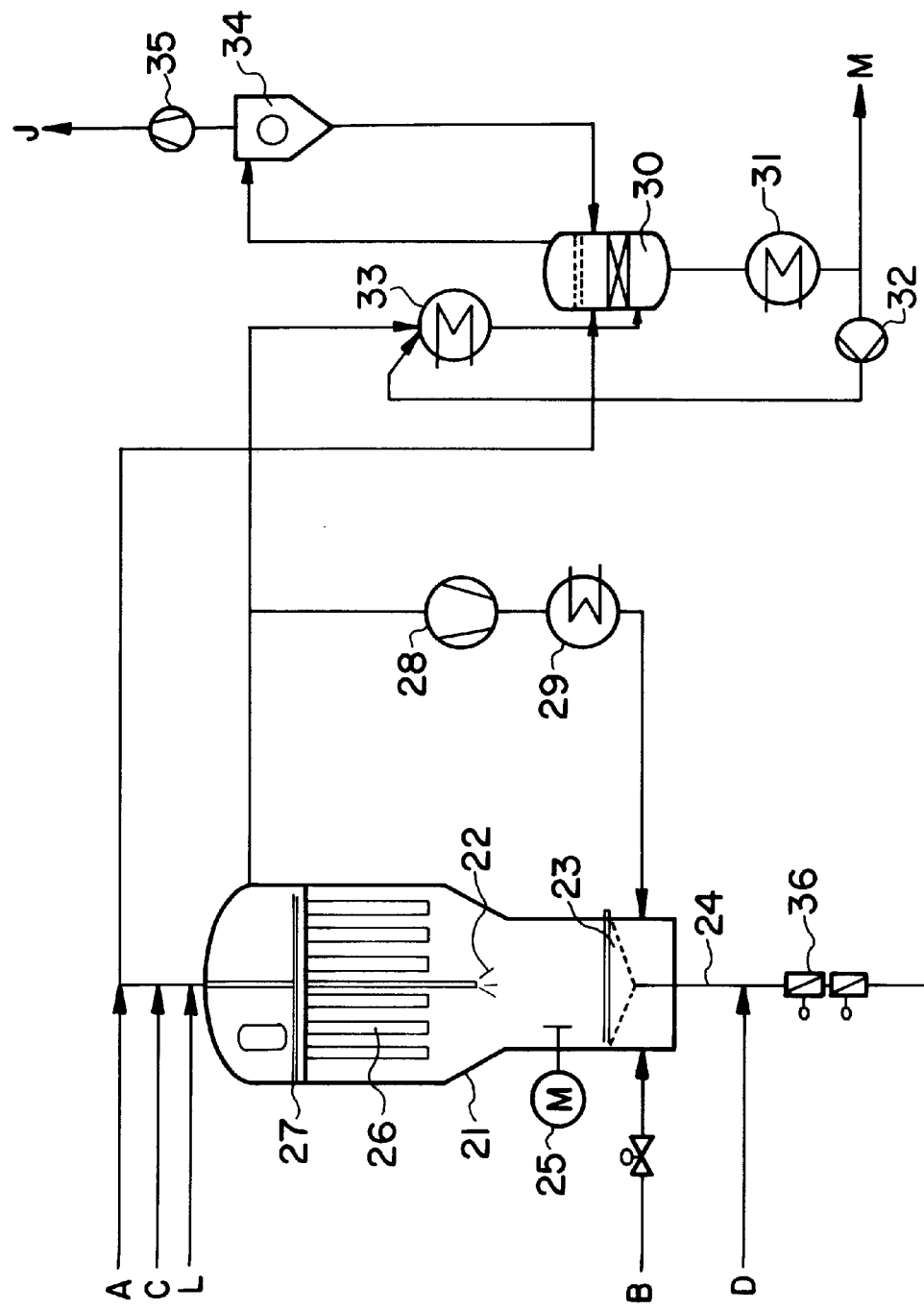
FIG. 2 shows a process scheme for an alternative embodiment of the RFBG process, wherein dust collection is integrated in the reactor, excess steam is condensed and the vent gas is scrubbed.
Figure 3:
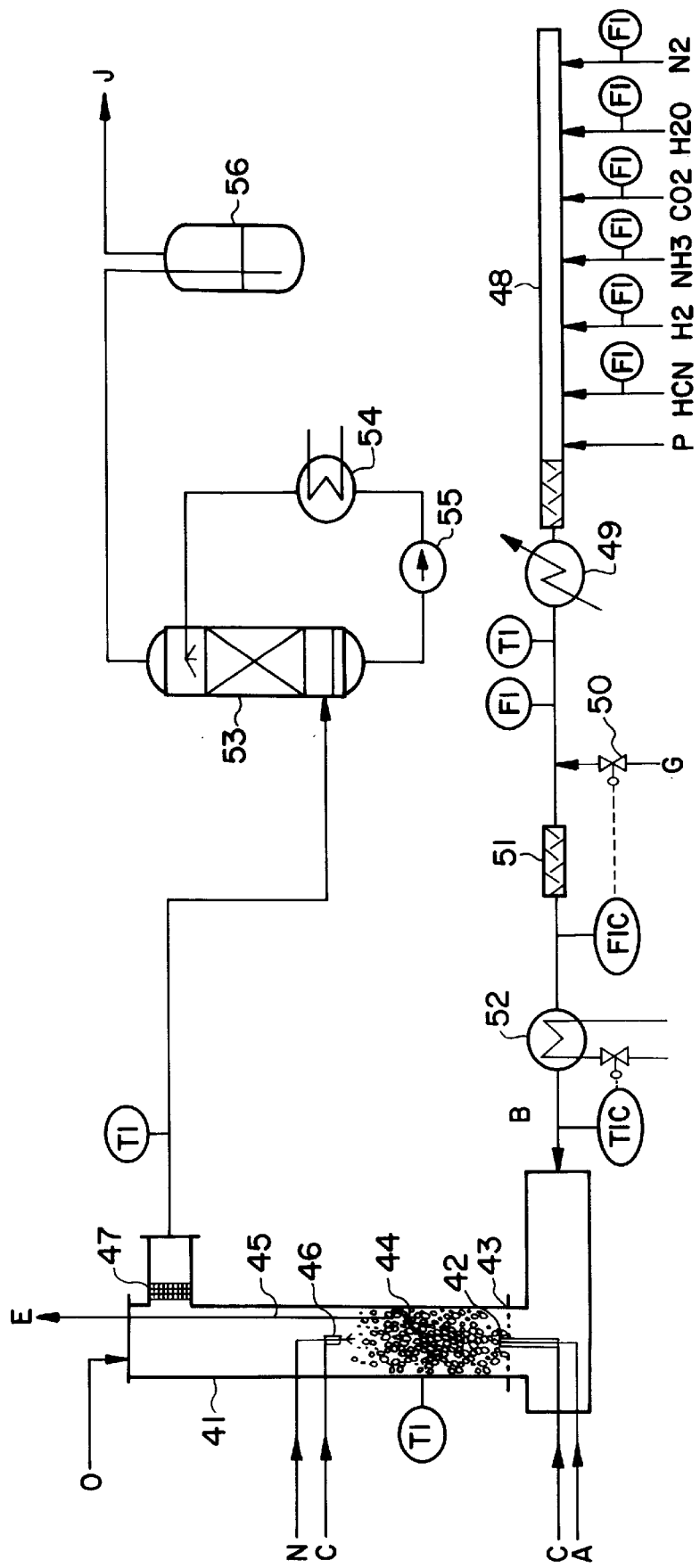
FIG. 3 shows a process scheme using laboratory equipment for performing the process according to the invention, wherein the Andrussow process is simulated, the Andrussow reaction gas is cooled by introducing water and the gas mixture obtained is supplied to the reactor in the RFBG process as an HCN-containing fluidizing gas and the vent gas is removed under suction via a scrubber.

FIG. 1 is labelled with numbers 1 to 14, FIG. 2 is labelled with numbers 21 to 35 and FIG. 3 is labelled with numbers 41 to 56. Streams of materials which are entering or leaving the system are labelled uniformly with letters: A concentrated alkali solution, B HCN-containing gas, C propellant gas for 2-fluid nozzle, D classifying gas, E alkali metal cyanide granules, F excess steam, G water for producing steam, H fuel gas (for starting up), I combustion air, J vent gas, K waste steam, L flushing gas, K waste steam, L flushing gas, M effluent water, N alkali metal cyanide solution, O seed granules, P steam.

The embodiment shown in FIG. 1 is suitable in particular when HCN-containing gases with a high proportion of fuel are used, that is in particular HCN- and hydrogen-containing gases such as are obtained in the BMA process and the Shawinigan process. In this case the vent gas may be taken directly to a combustion process which simultaneously provides heat for heating up the circulating gas. During continuously operating reactive fluidized bed granulation, a concentrated alkali solution (A) is sprayed into the fluidized bed in the RFBG reactor (1) using single or multi-component nozzles (2). If a two-fluid nozzle is used, the propellant gas (C) may be either an inert gas, for example nitrogen, or an HCN-containing gas. The seed granules required for operation are placed in the reactor at the start. In the operational state these seed granules form the fluidized bed (shown in FIG. 1 as small spheres). During operation the number of seed granules can be controlled by means of an impact device (5) located in the fluidized bed. When the granules have grown to the target particle size, they are withdrawn (E) from the reactor by means of a classifying take-off (4); a classifying gas (G) is supplied to the classifying device which is not shown in detail. Addition of the HCN crude gas from a BMA process (B) takes place below the base of the fluidized bed (3), but may, as an alternative to this or to supplement the HCN-containing gas, also be used as the propellant (C) or be passed directly in to the fluidized bed (not shown). The vent gas stream which contains solids is purified in a separator (6); the solids collected are recycled to the reactor. The vent gas stream which contains no solids is separated into two sub-streams, to be precise into a first sub-stream, also called the circulating gas stream, and a second sub-stream which contains the excess gas. The circulating gas stream is supplied to the RFBG reactor (1) again via a superheater (9) located in a combustion chamber (8) using a circulating gas blower (7). The excess gas is removed under suction using a fan (13) which is operated under a slight reduced pressure in this variant of the plant. The fuel-rich excess gas obtained by suction using fan (13) is supplied to the combustion chamber (8); heat for superheating the circulating gas (9) is provided by combustion. When starting up, and/or as a supplement, a fuel gas (H) may also be supplied to the combustion chamber. Combustion air (I) is supplied to the combustion chamber via a blower (12). The combustion chamber itself also contains a catalyst (10), in order to remove nitrogen from the vent gas (J). Depending on the throughput capacity in the reactor and the thermal value of the HCN-containing gas, an excess of energy is produced which can be used e.g. for the additional production of steam, by introducing water (G) to the combustion chamber and evaporating this in the superheater (11). The additionally-produced steam can be used to operate a steam turbine (14) which drives the circulating gas blower (7); waste steam (K) is withdrawn from the steam turbine. Furthermore the additionally-produced steam may be used as a classifying gas or for other purposes (F).

The device shown in FIG. 2 for reactive fluidized bed granulation is suitable in particular for producing fine but dust-free granules. The reactor (21) includes one or more spray nozzles (22), the fluidized bed base (23), a device ((24) in combination with the supply of classifying gas (D)) for classifying and removing the granules (E), an impact device (25) to reduce the size of the granules, filter hoses (26) integrated in the reactor and a jet device (27) not shown in detail, by means of which, in combination with the supply of flushing gas (L), the filter hoses are cleaned. An HCN-containing gas (B) is introduced from beneath the base of the fluidized bed. An aqueous alkali metal hydroxide solution (A) is sprayed onto the fluidized bed (not shown in FIG. 2) using a propellant (C) and a two-fluid nozzle (22). The dust-free gas leaving the reactor is again separated into two sub-stream. The circulating gas stream (first sub-stream) is fed back into the reactor (21) via a heater (29) using the fan (28). The excess vapors (second sub-stream) removed from the gas circulation system are taken to a heat exchanger (33) where water vapor in the excess vapors is condensed. Residual gases containing non-reacted hydrocyanic acid are neutralized in scrubber (30) with concentrated alkali solution (A) and removed for further treatment in the effluent water (M). The scrubber circuit includes another heat exchanger (31) and a circulating pump (32). The volatile constituents are passed from the scrubber via a trickle separator (34) and a vent gas fan (35) to a combustion unit. The vent gas fan (35) adjusts the pressure in the plant. The alkali metal cyanide granules are removed from the reactor via an exit lock (36).

In the process shown in FIG. 3, the Andrussow process and reactive fluidized bed granulation are linked via the cooling unit for the Andrussow crude gas. As is known, in the Andrussow process a mixture of methane/ammonia and air is passed over catalyst beds in the reactor and reacted to give hydrogen cyanide and water after adjusting the ignition temperature to greater than 1000° C. A typical composition for the reaction gas mixture was given above. In order to avoid HCN decomposition, the reaction gas must be rapidly cooled to below 400° C. This is achieved by passing quenching water into the reactor directly after reaction and/or removing the heat in a waste heat boiler. Whereas energy is normally lost in the quenching process, surprisingly it was found that the operating parameters for the RFBG process and the Andrussow process can be mutually adjusted in such a way that direct linkage of the processes is possible via the reaction gas. For this purpose the cooled Andrussow reaction gas is used directly as a fluidizing gas in the RFBG reactor. The hydrogen cyanide is then already present in the fluidizing gas stream and determines the amount of alkali hydroxide solution to be sprayed into the fluidized bed. The amounts of heat and substances in the fluidizing gas stream can be regulated and precisely adjusted to conditions prevailing in the reactive fluidized bed by means of the type of cooling used for the reaction gas.

As stated above, the Andrussow gas is generally cooled by quenching and/or by direct heat exchange. During linkage of the Andrussow process with the RFBG process in accordance with the invention, the cooling process is used to set the process conditions in the reactive fluidized bed. To set a gas inlet temperature in the RFBG reactor of preferably less than 400° C., the mass flow of fluidizing gas and thus the rate of fluidization in the fluidized bed can be affected by the amount of quenching water. The greater the proportion of cooling achieved by means of quenching, the smaller is the amount of indirect heat removal by means of a heat exchanger, and vice versa. Thus simple regulation of the process conditions in the fluidized bed is possible. It is also possible to omit the indirect heat exchanger completely and set the desired fluidizing gas temperature simply by means of quenching the Andrussow reaction gases.

Since on the one hand the energy input to the RFBG reactor can be adjusted via the type of cooling process used for the reaction gas from the Andrussow reactor, e.g. by varying the mass flow via the amount of quenching water, and the gas temperature can be kept constant by means of the waste heat boiler, and on the other hand the capacity of the RFBG reactor is a measure of the temperature difference between the gas inlet temperature and the vent gas temperature, the vent gas temperature is set for a given HCN conversion and corresponding introduction of concentrated alkali solution. It was found that the RFBG process can be operated over a wide temperature range of vent gas temperatures. The vent gas temperature is preferably in the range between 100 and 200° C., which is slightly higher than the fluidized bed temperature. If cooling of the Andrussow reaction gas is produced mainly or completely by means of quenching, then a high vent gas temperature is set due to the high mass flow of gas. The reserve capacity in the RFBG reactor produced in this way can then be used by spraying alkali metal cyanide solution into the reactor in addition to alkali metal hydroxide solution. This alkali metal cyanide solution may arise for example from the vent gas scrubbing procedure for an HCN-containing process gas.

A further embodiment (not shown in FIG. 3) of the linkage between the Andrussow process and the RFBG process according to the invention comprises recycling some of the RFBG vent gas into the Andrussow reactor after a hot gas filtration procedure aimed at removing dust. An improvement in the yield of the process is produced by means of this recycling procedure. Although the HCN concentration in the reaction gas is reduced when using this type of process management, this is a disadvantage because then spraying water into the reaction stream can be avoided because the mass flow for fluidizing and for heat input into the RFBG reactor is increased by the gas sub-stream supplied to the circuit. The reaction gases in the Andrussow reactor are then cooled only or mainly by means of an indirect heat exchanger.

The reaction gas from the Andrussow process may also be split into parallel solution and solid production, by passing one sub-stream through the RFBG reactor and supplying the other sub-stream directly to solution production. The vent gas from the RFBG reactor which may contain residual hydrogen cyanide and alkali metal cyanide dust may advantageously be mixed with the gas sub-stream which is supplied to solution production. Thus vent gas treatment associated with the RFBG reactor can then be minimized or omitted altogether. Splitting the gas stream produces high flexibility in the product mix of solution and granules.

When using Andrussow gas as a source of HCN in the RFBG process, alkali metal carbonate is also formed due to the $CO_2$ content of the Andrussow gas. Before the actual competitive reactions can take place however, the gases HCN and $CO_2$ have to diffuse into the alkali metal hydroxide solution with which the seed granules are wetted. HCN diffuses much better than $CO_2$ so only some of the $CO_2$ introduced can react before the granules are dry. The concentration of alkali metal carbonate in the alkali metal cyanide granules produced according to the invention is therefore much lower than in the case of preparing granules by absorbing the Andrussow gas in a concentrated alkali solution followed by fluidized bed spray granulation of the alkali metal cyanide solution, which would contain the entire amount of $CO_2$ in the Andrussow gas as alkali metal carbonate if no additional purification steps are taken.

In the laboratory equipment shown in FIG. 3 a gas from an Andrussow reactor was not used but a typical Andrussow gas composition was produced synthetically by mixing the individual constituents in a mixing zone (48) and heating the gas mixture in a heating unit (49). Solely on the basis of the experimental conditions, carbon monoxide was replaced by nitrogen and in addition a larger amount of water vapor (P) was added so that the gas mixture did not have to be heated up too much. Water (G) is introduced into the gas mixture which had been heated to 650° C. and evaporated in the mixing zone (51). The amount of water is controlled by measuring the volume flow of the reaction gas (50). The reaction gas is adjusted to a constant temperature between 350° and 380° C. by means of an indirect heat exchanger (52). The gas is introduced into the lower section of the RFBG reactor (41) and flows through a perforated plate (43) into the fluidized bed (44). Alkali metal hydroxide solution (A) is sprayed from below upwards into the fluidized bed by means of a two-fluid nozzle passing centrally through the perforated plate using nitrogen as the propellant (C). Another two-fluid nozzle (46) is located in the reactor, whose ratio of height to diameter is about 30, so that either alkali metal hydroxide solution or alkali metal cyanide solution can be sprayed into the fluidized bed from above downwards. At the start of the test, the seed granules (O), forming the fluidized bed are placed in the reactor, the granules (E) are removed under suction using a tube (45), after terminating the test. In the upper section of the reactor the vent gas is removed under suction via a scrubber (53) after passage through a filter (47). The scrubbing circuit thus consists of the scrubber, the pump (55) and a heat exchanger (54). The vent gas (J) is discharged after passage through a trickle separator (56).

Alkali metal cyanide granules with especially advantageous combinations of properties and an extraordinarily high purity can be prepared by the process according to the invention when using a low $CO_2$, preferably substantially $CO_2$-free, HCN-containing gas, for example a BMA crude gas. Accordingly, alkali metal cyanide granules based on sodium cyanide or potassium cyanide with the following characteristics were found:

(i) substantially spherical particles with smooth or raspberry-like surface structures, (ii) particle diameter in the range 0.1 to 20 mm, preferably 1 to 20 mm, for 99 wt. % of the granules, (iii) bulk density of at least 600 $g/dm^3$, preferably greater than 650 $g/dm^3$, (iv) abrasion less than 1 wt. %, measured in a roller abrasion test (TAR abrasion tester from the Erweka Co. with a 20 g sample, 60 min, 20 rpm)

(v) caking index of at most 4, preferably 3 or less than 3, measured after applying a load of 10 kg to 100 g for 14 days in a cylinder with an internal diameter of 5.5 cm, which is characterized in that the concentration of alkali metal carbonate is less than 0.5 wt. % and the concentration of alkali metal formate is less than 0.3 wt. %, wherein the alkali metal in the by-products mentioned is identical to that in the alkali metal cyanide.

Preferred granules contain alkali metal carbonate and alkali metal formate in an amount of altogether less than 0.4 wt. %. NaCN and KCN granules contain in particular less than 0.1 wt. % of alkali metal carbonate and less than 0.1 wt. % of alkali metal formate. Alkali metal cyanide granules with the above-mentioned very low concentration of alkali metal carbonate and alkali metal formate by-products can be prepared in particular by an embodiment of the process according to the invention in which an HCN-containing reaction gas is used which is substantially free from carbon dioxide and steam is used as the fluidizing gas.

Alkali metal cyanide granules with the features (i) to (iv), as is known from EP-A 0 600 282, can be prepared by direct fluidized bed spray granulation of an alkali metal cyanide solution. Express reference is made to the document mentioned with regard to the definition and methods of determination of these features. Differently from the process according to the invention which uses a substantially $CO_2$-free HCN-containing gas, in the previously known process products are always obtained which have a high alkali metal carbonate content and thus cannot be used in the electrolytic field. This problem is solved by the invention.

Apart from providing alkali metal and alkaline earth metal cyanide granules with a particularly advantageous combination of properties, the process according to the invention is characterized by further advantages. The process is characterized by a particularly high space-time yield and a low energy consumption. By means of the process it has been possible to eliminate the sometimes complicated separate preparation of an alkali metal cyanide or alkaline earth metal cyanide solution which can lead to secondary products. This leads to a much lower investment in industrial equipment. The process enables different sources of HCN-containing gases to be used, including BMA reaction gas and Andrussow reaction gas. Depending on the HCN-containing gas used, there are different variants for the process which lead to both high flexibility and low energy consumption. Further advantages comprise the fact that either BMA or Andrussow reaction gas can be used in the process according to the invention in the condition in which it is produced from the corresponding reactor with a temperature of more than 1000° C., wherein the reaction gas can be cooled either by injecting it into a gas circuit and/or by quenching with water.

Due to direct linkage of the Andrussow process and the RFBG process, the economic viability of preparing solid alkali metal cyanide granules is clearly improved. The energy in the reaction gas from the Andrussow reactor is used directly to evaporate the water introduced in the alkali metal hydroxide solution and the water formed during neutralization, without having to be transported through indirect heat-exchanging equipment. No conveying equipment or separate heating systems are required for the fluidizing gas in the fluidized bed. Excess energy can also be used to spray an alkali metal cyanide solution into the reactive fluidized bed granulator for the purpose of forming granules, in parallel with the process according to the invention.

EXAMPLES 1 AND 2

NaCN granules were prepared from caustic soda solution and BMA crude gas by the RFBG process according to the invention in a device and under the conditions previously described for FIG. 1.

Base diameter of the

RFBG reactor: 250 mm

Fluidizing gas: circulating gas with $H_2O$-steam

Temperature: 270° C.

Amount: 10 $m^3/h$

BMA-gas inlet: below the base

Temperature: 150° C.

Amount: 1.09 kg/h HCN

NaOH solution (35 wt. %): 2.33 kg/h

Vent gas temperature*): 105° C.—Example 1

110° C.—Example 2

*) The temperature in the fluidized bed was about 10° C. above the vent gas temperature.

Substantially spherical granules with a smooth surface and a particle diameter in the range 4 to 5 mm, a bulk density in the range 700 to 750 g/l, an abrasion of less than 0.1 wt. %, and a caking index of less than 3 were obtained in both examples.

The chemical composition is given in the table below:

|                         | Example 1 | Example 2 |
| ----------------------- | --------- | --------- |
| Vent gas temperature (°C.) | 105    | 110       |
| NaCN                    | 98.30     | 98.07     |
| NaOH                    | 1.01      | 1.12      |
| $Na_2CO_3$              | 0.18      | 0.08      |
| Na formate              | 0.18      | 0.11      |
| $H_2O$                  | 0.33      | 0.62      |

The sodium formate content resulted substantially from the seed granules initially introduced: the NaCN seed granules used had an average particle diameter of 2 mm and contained 0.72% of $Na_2CO_3$ and 0.70% of HCOONa.

EXAMPLE 3

In a device in accordance with FIG. 2, KCN granules were prepared from caustic potash solution (40 wt. %) and HCN gas from a BMA reactor with a typical BMA composition.

Fluidized bed temperature: 107° C.

Amount of circulated gas: 10 m³/h

Inlet temperature of circulating gas: 150° C.

Molar ratio HCN/KOH: 1.08

Spherical granules with a bulk density of 700 to 750 g/l, which were completely dust-free and abrasion-resistant and did not cake were obtained. Chemical analysis was as follows:

| KCN       | 99.1% |
| --------- | ----- |
| KOH       | 0.2%  |
| $K_2CO_3$ | 0.1%  |
| HCOOK     | 0.1%  |
| $H_2O$    | 0.5%  |

EXAMPLE 4

The process according to the invention was performed in the laboratory equipment shown in FIG. 3 and under the conditions described above. Example 4 and Examples 5 and 6 describe linking the Andrussow process with the RFBG process. The Andrussow gas composition was simulated by mixing HCN, $H_2$, $NH_3$, $CO_2$, $H_2O$ and $N_2$. To simulate the inert CO fraction of an Andrussow gas, the proportion of nitrogen was increased. In addition about 3 to 4 kg/h of steam were admixed with stream P so that the overall flow amounted to about 18 to 19 kg/h, the gas mixture was heated in heating unit (49) to about 650° C. and then cooled by spraying 3 to 4 kg/h of water (G) into the mixture to simulate quenching, so that the rate of flow into the RFBG reactor was about 21 to 23 kg/h. A gas temperature of about 350° C. was regulated via the indirect heat exchanger (52) and the gas was introduced into the RFBG reactor at this temperature. Nozzle (42) was supplied with 50% strength pre-heated caustic soda solution; spraying took place from below upwards. Pre-heated nitrogen was used as propellant. 1.5 kg of NaCN granules with a size of 0.2 to 0.3 mm were initially introduced into the reactor. The granules were pre-heated and then gas mixing was started. Addition of caustic soda solution was performed in approximately stoichiometric proportion, with reference to the HCN. Temperatures between 105° and 125° C. were measured in the vent gas stream in the steady state. About 4 kg of granules were removed under suction from the reactor. The product contained 92.3% of NaCN. The remainder was mainly NaOH, soda and residual moisture.

EXAMPLE 5

The same conditions as described in Example 4 were used on the gas side. The heat exchanger (52) was not operated and the amount of water required for quenching was increased to 4 to 4.5 kg/h so that the gas inlet temperature in the RFBG apparatus was about 380° C. With comparable amounts of caustic soda solution sprayed in, the temperature of the vent gas was between 105 and 145° C.

EXAMPLE 6

The same experimental conditions were used as described in Example 4. In addition a 20% strength sodium cyanide solution was sprayed in through nozzle (46). The feed to the nozzle (46) was slowly increased until the vent gas temperature had dropped to about 110° C. In this state up to 0.4 kg/h of the 20% strength cyanide solution could be sprayed in. The cyanide content of the product was 95%.

What is claimed is:

1. A process for preparing alkali metal cyanide or alkaline earth metal cyanide granules in a reactor including reacting hydrogen cyanide with an alkali metal hydroxide or alkaline earth metal hydroxide, wherein the alkali metal hydroxide is sprayed into the reactor as an aqueous solution or the alkaline earth metal hydroxide is sprayed into the reactor as an aqueous suspension and there reacted with gaseous hydrogen cyanide, and evaporating the water introduced to and formed in the reactor;

wherein said process comprises carrying out the reacting step in a reactor having a fluidized bed for fluidized bed spray granulation at a fluidized bed temperature in the range 100° to 250° C.;

spraying the solution or the suspension onto the fluidized bed that consists essentially of seed granules of alkali metal cyanide or alkaline earth metal cyanide being produced, simultaneously supplying a hydrogen cyanide-containing gas to the reactor in an amount of at least one mole of HCN per metal equivalent;

reacting said solution of alkali metal hydroxide or suspension of alkaline earth metal hydroxide with said hydrogen cyanide gas in a neutralization reaction; and evaporating the water by means of a stream of fluidizing gas, having an inlet temperature between 110° and 500° C., flowing through the fluidized bed.

2. The process according to claim 1, wherein the hydrogen cyanide-containing gas comprises a reaction gas from a BMA or Shawinigan process containing hydrogen cyanide and hydrogen as major constituents.

3. The process according to claim 1, wherein the hydrogen cyanide-containing gas comprises a reaction gas from an Andrussow process containing HCN, $N_2$, $H_2$, $H_2O$ and CO as major constituents.

4. The process according to claim 1, comprising preparing alkali metal cyanide granules selected from the group consisting of NaCN granules and KCN granules, wherein the molar ratio of HCN to the alkali metal hydroxide is in the range between 1 and 5 and the alkali metal hydroxide solution being sprayed has a concentration of alkali metal hydroxide in the range 10 to 70 wt. %.

5. The process according to claim 1, comprising mixing the hydrogen cyanide-containing gas with the fluidizing gas stream below a base of the fluidized bed.

6. The process according to claim 1, comprising introducing the hydrogen cyanide-containing gas to the reactor in a region of the fluidized bed.

7. The process according to claim 1, comprising carrying out the reaction with a fluidized bed temperature in the range 105° to 180° C. and with a fluidizing gas inlet temperature in the range 120° to 400° C.

8. The process according to claim 1, comprising using superheated steam or a superheated steam-containing gas mixture as the fluidizing gas.

9. The process according to claim 1, wherein a gas stream emerging from the fluidized bed is split into two sub-streams, a first sub-stream is re-heated and used as fluidizing gas and a second sub-stream is removed from the circuit.

10. The process according to claim 9, comprising mixing the first sub-stream with a hydrogen cyanide-containing gas to form a gas mixture and the gas mixture is used as the fluidizing gas.

11. The process according to claim 10, wherein the mixing step comprises adding the first sub-stream to a substantially HCN and $H_2$-containing reaction gas from a BMA process or Shawinigan process with a temperature in the range 1000° to 1500° C., wherein the reaction gas is cooled and the first sub-stream is heated, and the gas mixture obtained is used as the fluidizing gas.

12. The process according to claim 3, wherein the HCN-containing reaction gas leaving a reactor for the Andrussow process with a temperature of more than 1000° C., is quenched by introducing water and thereby cooled to a temperature in the range 150° to 500° C. and used as the fluidizing gas.

13. The process according to claim 12, comprising preparing NaCN or KCN granules by spraying NaCN-containing or KCN-containing aqueous solution onto the seed granules in addition to the alkali metal hydroxide solution, wherein the NaCN-containing or KCN-containing solution comprises a solution obtained from vent gas scrubbing of a vent gas stream emerging from the reactor for fluidized bed spray granulation.

14. The process according to claim 12, comprising dividing the vent gas stream emerging from the reactor for fluidized bed spray granulation into two streams, and a first stream is recycled to a reactor for the Andrussow process, after removing dust, and the second stream is removed from the circuit.

15. The process according to claim 13, comprising dividing the vent gas stream emerging from the reactor for fluidized bed spray granulation into two streams, and a first stream is recycled to a reactor for the Andrussow process, after removing dust, and the second stream is removed from the circuit.

16. A process for preparing alkali metal cyanide or alkaline earth metal cyanide granules according to claim 1, wherein said neutralization reaction takes place on a surface of the seed granules within the fluidized bed.

17. Alkali metal cyanide granules based on sodium cyanide or potassium cyanide, comprising:
   (i) substantially spherical particles with smooth or raspberry-shaped surface structure;
   (ii) particle diameters in the range 0.1 to 20 mm for 99 wt. % of the granules;
   (iii) a bulk density of at least 600 $g/dm^3$;
   (iv) abrasion of less than 1 wt. % measured in a roller abrasion test;
   (v) caking index of at most 4, measured after applying a load of 10 kg to 100 g for 14 days in a cylinder with internal diameter 5.5 cm;

wherein concentration of alkali metal carbonate is less than 0.5 wt. % and concentration of alkali metal formate is less than 0.3 wt. %, wherein alkali metal in the carbonate and formate is the same as in the alkali metal cyanide.

18. Alkali metal cyanide granules according to claim 17, wherein total alkali metal carbonate and alkali metal formate is less than 0.4 wt. %.

* * * * *